Patented May 11, 1937

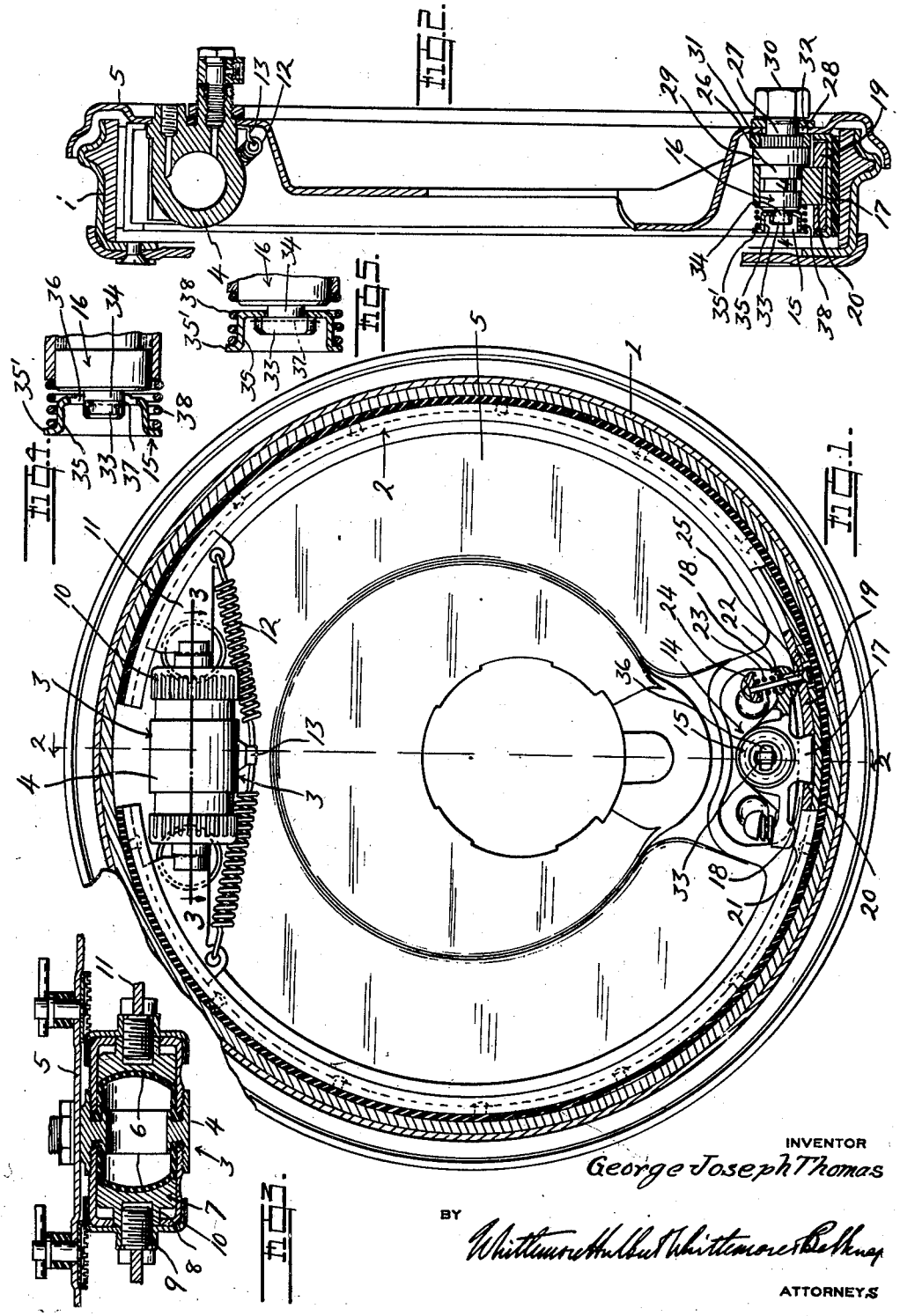

2,080,155

UNITED STATES PATENT OFFICE 2,080,155

BRAKE STRUCTURE

George Joseph Thomas, Detroit, Mich., assignor to Kelsey-Hayes Wheel Company, Detroit, Mich., a corporation of Delaware Application April 30, 1934, Serial No. 723,238

10 Claims. (Cl. 188—78)

The invention relates to brake structures and refers more particularly to brake structures of that type in which the brake friction means is a single flexible brake shoe.

One of the objects of the invention is to provide an improved construction for retaining the brake friction means in place, the construction being such that the friction means may be readily and quickly assembled upon its support and removed. Another object is to provide an improved mounting for an actuating member for the friction means, the mounting being constructed to retain and properly position the friction means through the actuating member.

These and other objects of the invention will become apparent from the following description, taken in connection with the accompanying drawing, in which Figure 1 is an elevation, partially in section, of a brake structure embodying my invention;

Figures 2 and 3 are cross sections respectively on the lines 2—2 and 3—3 of Figure 1;

Figure 4 is a cross section on the line 4—4 of Figure 2;

Figure 5 is an enlarged view of a portion of Figure 2.

The brake structure embodying my invention is designed particularly for use in motor vehicles and has the brake drum 1 which is adapted to be secured to one of the motor vehicle wheels and the brake friction means 2 within the brake drum. This brake friction means in the present instance is a single flexible brake shoe comprising a transversely split band flexible throughout its length between its separable end portions.

For spreading the separable ends of the band to apply the brake, I have provided the actuator 3. This actuator, as shown, is of the hydraulic type, but it is apparent that it may be of the mechanical type. The actuator comprises the housing 4 which is mounted upon the backing plate 5 between the separable end portions of the band. 6 are flexible cup-shaped diaphragms preferably formed of rubber clamped within the housing and 7 are pistons slidable within the housing and engaged by the diaphragms and having the reduced portions 8 adapted to extend through the ends of the housing. 9 are screws extending axially of and freely into the reduced piston portions and 10 are nuts threaded upon the screws and abutting the outer ends of the reduced piston portions. The heads of the screws are bifurcated to receive the brackets 11 which are secured to the separable end portions of the band, the arrangement being such that the screws and the associated parts of the actuator serve to laterally position the separable ends of the band in addition to being adapted to spread apart these separable ends.

12 are retracting springs connected to the brackets 3 and also to the bracket 13 upon the backing plate 5, these retracting springs serving to resiliently hold the brackets 3 in the slots of the screw heads at all times and also serving to return the separable ends of the bands to their retracted positions upon relief of pressure within the actuator. It will be noted that the retracted positions of the separable ends of the band are controlled by the abutment of the nuts 10 with the ends of the housing 4.

The central portion of the band, which is diametrically opposite the actuator, is adapted to be urged radially outwardly toward the brake flange of the brake drum 1 by the device 14 which is operable after the spreading apart of the separable ends of the band and upon circumferential movement of this band. This device comprises the rockable member 15 which is journaled upon the anchor pin 16 and which has the part 17 extending outwardly from the anchor pin toward the band and the transversely extending parts 18. The part 17 is operatively connected to the band so that circumferential movement of the band will rock the rockable member. As shown, 19 is a flexible plate secured to the inner side of the band and having the opening 20 into which the part 17 extends. The parts 18 are engageable with the inner face of the plate 19 so that upon rocking of the rockable member either the one or the other of these parts exerts an outward force on the band through the plate to thereby urge the central portion of the band outwardly against the brake flange. The faces 21 of the parts 18 engageable with the plate 19 are preferably rounded and the portions of the parts 18 having these faces are preferably recessed at 22 to receive the outer ends of the coil springs 23. The inner ends of these coil springs abut the washers 24 upon the headed pins 25, the latter extending freely through the parts 18 and the plate 19 and having their heads in engagement with the outer side of the plate. The arrangement is such that the faces 21 are normally held in contact with the plate 19 so that in the retracted position of the band it will be centered out of contact with the brake flange. It will be noted that the opening 20 is intermediate the side edges of the plate 19 and that the part 17 has a width substantially equal to that of the opening.

The anchor pin 16 has the cylindrical portion 26 upon which the rockable member 15 is journaled, the reduced shank 27 which extends transversely through the radially extending slot 28 in the backing plate 5 and the enlarged cylindrical portion 29 between the cylindrical portion 26 and the shank 27. 30 is a nut threaded upon the shank 27 and adapted to clamp the anchor pin to the backing plate, there being preferably the plate 31 between the enlarged cylindrical portion 29 and the backing plate and the plate 32 between the nut and the backing plate. The anchor pin also comprises the head 33 at its end within the brake drum and the reduced portion or neck 34 between the head and the cylindrical portion 26. The head is polygonal shaped and preferably elongated and the length of the head is less than the diameter of the cylindrical portion 26 so that the rockable member 15 may be readily and quickly assembled in its proper position upon the anchor pin or removed. 35 is a sheet metal cup-shaped retainer having in its base the elongated opening 36 of a size to provide for moving the retainer over the head 33. This retainer also has in its base the transversely extending recessed portion 37 which is adapted to receive the head 33 after the retainer has been passed over the head and rotated through approximately 90 degrees. 38 is a coil spring having one end encircling a part of the cylindrical portion 26 of the anchor pin and abutting the end of the hub of the rockable member and the other end encircling the retainer and abutting the radially extending annular flange 35' of the retainer. This coil spring serves to yieldably position the central portion of the band in place by holding the side of this band adjacent the backing plate in contact therewith through the rockable member. This coil spring also serves to yieldably hold the retainer in place with the head of the anchor pin engaging the recessed portion in the base of the retainer so that the retainer will not become accidentally disengaged.

With this construction it will be readily seen that the brake friction means may be readily assembled or removed and it will also be seen that both the end portion and the central portion of this brake friction means are laterally positioned in a very simple and efficient manner. It will further be seen that the rockable member for actuating the central portion of the brake friction means may be readily mounted on or demounted from the anchor pin and that the retainer may be readily secured to the anchor pin or removed therefrom.

What I claim as my invention is:

1. In a brake structure, the combination of an anchor pin, an actuating member for a brake friction means mounted on said pin, a retainer for the friction means secured to said pin, and resilient means between said retainer and actuating member and serving to hold said retainer from accidental disengagement from said pin and to position the friction means.

2. In a brake structure, the combination of a flexible brake shoe having separable ends, a support, means upon said support for spreading said ends apart, said means comprising bifurcated members laterally positioning said ends, an actuating member for said brake shoe intermediate said ends, said actuating member laterally positioning the intermediate portion of said brake shoe, and quick detachable retaining means secured to said support and serving to hold said actuating member in place relative to said support.

3. In a brake structure, the combination of an anchor pin having a polygonal head, an actuating member for a brake shoe mounted on said pin, a retainer for the brake shoe having a polygonal opening providing for moving said retainer over said head, said retainer being rotatable on said pin to move its opening out of registration with said head, and means for holding said retainer from accidental rotation relative to said pin.

4. In a brake structure, the combination of an anchor pin having an elongated head, an actuating member for a brake shoe rotatably mounted on said pin and laterally positioning the brake shoe, a retainer for said actuating member, said retainer having an elongated opening of a size to provide for moving said retainer over said head and also having an elongated recessed portion extending transversely of the opening and adapted to receive said head, said retainer being rotatable relative to said pin to move said recessed portion into registration with said head, and resilient means serving to hold said retainer from accidental disengagement from said pin.

5. In a brake structure, the combination with brake friction means and an anchor pin therefor, of an actuating member for the brake friction means mounted on said pin, a retainer for the actuating member mounted on the pin and removable therefrom by a limited rotation in one direction, and resilient means cooperating with the retainer to position the friction means through the actuating member and to hold the retainer from accidental rotation.

6. In a brake structure, the combination of a flexible brake shoe having separable ends, a support, means carried by the support for spreading the ends apart and for laterally positioning said ends, an actuating member for the brake shoe intermediate the ends aforesaid thereof, and means cooperating with the actuating member to laterally position the intermediate portion of the brake shoe including a retainer mounted upon the support and operable to hold the actuating member in place relative to the support.

7. In a brake structure, the combination with brake friction means and an anchoring pin therefor, of an actuating member for the brake friction means mounted on said pin, a retainer for the actuating member mounted upon the pin between the latter member and free end of the pin, and resilient means interposed between the retainer and actuating member and reacting through the actuating member for positioning the friction means.

8. In a brake structure, the combination with brake friction means and an anchor pin therefor positioned intermediate the ends of the friction means, of an actuating member for the brake friction means removably mounted on said anchor pin, and yieldable means acting upon the actuating member for laterally positioning the friction means.

9. In a brake structure, the combination with a support, brake friction means movable relative to the support and having separable ends and a member fixed to the support intermediate the ends of the friction means, of an actuating member for the brake friction means removably mounted on the member, a retainer mounted on the first named member and yieldable means cooperating with the retainer in acting upon the actuating member for laterally positioning the friction means and for detachably securing the actuating member to the first named member.

10. In a brake structure, the combination with a support, brake friction means movable relative to the support and a member fixed to the support, of an actuating member for the friction means mounted on said fixed member, a retainer for the actuating member also mounted on the fixed member and removable therefrom by limited rotation in one direction, and means cooperating with the retainer to position the friction means through the actuating member and to hold the retainer in assembled relation with the first member.

GEORGE JOSEPH THOMAS.